United States Patent
Kwak et al.

(10) Patent No.: US 8,318,379 B2
(45) Date of Patent: Nov. 27, 2012

(54) MEMBRANE-ELECTRODE ASSEMBLY FOR MIXED REACTANT FUEL CELL AND MIXED REACTANT FUEL CELL SYSTEM INCLUDING SAME

(75) Inventors: Chan Kwak, Suwon-si (KR); Alexey AlexandrovichSerov, Suwon-si (KR); Myoung-Ki Min, Suwon-si (KR); Si-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 492 days.

(21) Appl. No.: 11/707,469

(22) Filed: Feb. 15, 2007

(65) Prior Publication Data

US 2007/0190396 A1  Aug. 16, 2007

(30) Foreign Application Priority Data

Feb. 16, 2006  (KR) .................. 10-2006-0015069

(51) Int. Cl.
*H01M 8/04* (2006.01)
*H01M 8/10* (2006.01)
(52) U.S. Cl. ............... 429/513; 429/512; 429/483
(58) Field of Classification Search ............. 429/30–34, 429/38–39, 40, 42–44; 427/115; 426/445, 426/468, 482, 408, 415, 452, 545, 456–459, 426/462–463, 465–467, 469–471, 479–481, 426/483, 507–508, 512–513, 515, 535
See application file for complete search history.

(56) References Cited

U.S. PATENT DOCUMENTS

| | | | |
|---|---|---|---|
| 6,663,997 B2 | 12/2003 | Dong et al. | |
| 6,723,464 B2 * | 4/2004 | Tabata et al. | 429/43 |
| 7,335,436 B2 | 2/2008 | Kim et al. | |
| 7,465,511 B2 | 12/2008 | Choi | |
| 7,745,037 B2 | 6/2010 | Matsuo et al. | |
| 2002/0192517 A1 | 12/2002 | Beckmann et al. | |
| 2003/0165727 A1 | 9/2003 | Priestnall et al. | |
| 2005/0074656 A1 | 4/2005 | Koyama et al. | |
| 2005/0084737 A1 | 4/2005 | Wine et al. | |
| 2005/0089743 A1 | 4/2005 | Lee | |
| 2005/0130010 A1 | 6/2005 | Choi | |

(Continued)

FOREIGN PATENT DOCUMENTS

CN  1681150 A  10/2005

(Continued)

OTHER PUBLICATIONS

Machine Translation and Abstract in English of JP 2003-297391.*

(Continued)

*Primary Examiner* — Barbara Gilliam
*Assistant Examiner* — Claire L Roe
(74) *Attorney, Agent, or Firm* — Christie, Parker & Hale, LLP

(57) ABSTRACT

A membrane-electrode assembly for a mixed reactant fuel cell and a mixed reactant fuel cell system including the same. In one embodiment of the present invention, a membrane-electrode assembly for a mixed reactant fuel cell includes an anode catalyst layer, a cathode catalyst layer, a polymer electrolyte membrane disposed between the anode catalyst layer and the cathode catalyst layer, an electrode substrate disposed on at least one of the anode catalyst layer or the cathode catalyst layer, and an oxidant supply path penetrating the polymer electrolyte membrane, the anode catalyst layer, the cathode catalyst layer, and the electrode substrate and adapted to supply an oxidant.

21 Claims, 3 Drawing Sheets

U.S. PATENT DOCUMENTS

| | | |
|---|---|---|
| 2005/0170227 A1 | 8/2005 | Corey et al. |
| 2005/0202300 A1 | 9/2005 | Poirot-Crouvezier |
| 2005/0287418 A1* | 12/2005 | Noh et al. .................. 429/40 |

FOREIGN PATENT DOCUMENTS

| | | |
|---|---|---|
| CN | 1703798 A | 11/2005 |
| DE | 10 2005 010 039 A1 | 9/2005 |
| GB | 2 412 005 A | 9/2005 |
| JP | 09-82336 | 3/1997 |
| JP | 2003-272697 | 9/2003 |
| JP | 2003-288918 | 10/2003 |
| JP | 2003297391 A * | 10/2003 |
| JP | 2004-500691 | 1/2004 |
| JP | 2004-501480 | 1/2004 |
| JP | 2005-108849 | 4/2005 |
| JP | 2005-108850 | 4/2005 |
| JP | 2004-146265 | 5/2005 |
| JP | 2005-129518 | 5/2005 |
| JP | 2002-313360 | 10/2005 |
| JP | 2007-220680 | 8/2007 |
| KR | 2001-0075356 | 8/2001 |
| KR | 2003-0066319 | 8/2003 |
| KR | 10-2004-0069147 | 8/2004 |
| KR | 10-2005-0036394 | 4/2005 |
| KR | 10-2005-0090876 | 9/2005 |
| WO | WO 00/19555 | 4/2000 |
| WO | WO 01/73881 A1 | 10/2001 |
| WO | WO 01/78179 A1 | 10/2001 |
| WO | WO 2004/034495 A1 | 4/2004 |

OTHER PUBLICATIONS

European Search Report dated May 29, 2007, for EP 07102505.0, in the name of Samsung SDI Co., Ltd.
Korean Patent Abstracts, Publication No. 1020040069147 A, dated Aug. 4, 2004, in the name of Naotake Kawamura et al.
Korean Patent Abstracts, Publication No. 1020050036394 A, dated Apr. 20, 2005, in the name of Byung Sun Hong et al.
Korean Patent Abstracts, Publication No. 1020050090876 A, dated Sep. 14, 2005, in the name of Ho Suk Kim et al.
European Search Report dated Jun. 18, 2007, for corresponding European application 07102669.4.
European Search Report dated Feb. 17, 2009, for corresponding European application 07102669.4.
Franco, Barbir, *PEM Fuel Cells: Theory & Practice*, Academic Press, Sustainable World Series, Jul. 2005, 3 pages.
Ulf, Bossel, *Efficiency of Hydrogen Fuel Cell, Diesel-SOFC-Hybrid and Battery Electric Vehicles*, European Fuel Cell Forum, Oct. 20, 2003, 4 pages.
Dumercy, L, et al., *PEFC Stack Operating in Anodic Dead End Mode*, vol. 4, Issue 4, Wiley InterScience, European PEFC Forum, Jul. 2003 (Abstract only).
Priestnall, M.A., et al., *Compact mixed-reactant fuel cells*, Journal of Power Sources, vol. 106, (2002), pp. 21-30.
Patent Abstracts of Japan and English machine translation for Japanese Publication 2004-146265.
Japanese Office action dated Sep. 28, 2010, for corresponding Japanese Patent application 2007-034950.
U.S. Office action dated Nov. 17, 2010, for cross reference U.S. Appl. No. 11/783,388.
U.S. Office action dated Jun. 8, 2011, for cross reference U.S. Appl. No. 11/707,745, 15 pages.
U.S. Office action dated Feb. 1, 2012, for cross reference U.S. Appl. No. 11/707,745, 16 pages.
U.S. Notice of Allowance dated Apr. 17, 2012, for cross reference U.S. Appl. No. 11/707,745, 16 pages.
Japanese Office action dated Aug. 10, 2010, for Japanese Patent application 2007-024551.

* cited by examiner

MEMBRANE-ELECTRODE ASSEMBLY FOR MIXED REACTANT FUEL CELL AND MIXED REACTANT FUEL CELL SYSTEM INCLUDING SAME

CROSS-REFERENCE TO RELATED APPLICATION

This application claims priority to and the benefit of Korean Patent Application No. 10-2006-0015069, filed in the Korean Intellectual Property Office on Feb. 16, 2006, the entire content of which is incorporated herein by reference.

FIELD OF THE INVENTION

The present invention relates to a membrane-electrode assembly for a mixed reactant fuel cell and a mixed reactant fuel cell system including the same.

BACKGROUND OF THE INVENTION

A fuel cell is a power generation system for producing electrical energy through an electrochemical redox reaction of an oxidant and hydrogen in a hydrocarbon-based material such as methanol, ethanol, or natural gas.

Representative exemplary fuel cells include a polymer electrolyte membrane fuel cell (PEMFC) and a direct oxidation fuel cell (DOFC). The DOFC includes a direct methanol fuel cell that uses methanol as a fuel.

The PEMFC provides a relatively high energy density, but it requires careful handling of hydrogen (or hydrogen-rich) gas and accessories such as a fuel reforming processor for reforming methane or methanol, natural gas, and the like in order to produce the hydrogen (or hydrogen-rich) gas as a fuel for the PEMFC.

In comparison, a DOFC provides a lower energy density than that of the PEMFC. However, the DOFC advantages include easy handling of a fuel, operability at room temperature due to its low operating temperature, and no need for additional fuel reforming processors.

In the above fuel cell systems, a stack that generates electricity includes several to scores of unit cells stacked in multiple layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with a polymer electrolyte membrane located between them. The polymer electrolyte membrane includes a proton conductive polymer.

SUMMARY OF THE INVENTION

Aspects of the present invention respectively provide a membrane-electrode assembly for a mixed reactant fuel cell that can provide a fuel and an oxidant to catalyst layers smoothly and evenly and a mixed reactant fuel cell system including the membrane-electrode assembly.

According to an embodiment of the present invention, a membrane-electrode assembly for a mixed reactant fuel cell includes: a polymer electrolyte membrane; an anode catalyst layer and a cathode catalyst layer; a polymer electrolyte membrane disposed between the anode catalyst layer and the cathode catalyst layer; an electrode substrate disposed on at least one of the anode catalyst layer or the cathode catalyst layer; and an oxidant supply path penetrating the polymer electrolyte membrane, the anode catalyst layer, the cathode catalyst layer, and the electrode substrate and adapted to supply an oxidant.

According to another embodiment of the present invention, a mixed reactant fuel cell system includes: a stack including at least one membrane-electrode assembly including: an anode catalyst layer and a cathode catalyst layer; a polymer electrolyte membrane disposed between the anode catalyst layer and the cathode catalyst layer; an electrode substrate disposed on at least one of the anode catalyst layer or the cathode catalyst layer; and an oxidant supply path penetrating the polymer electrolyte membrane, the anode catalyst layer, the cathode catalyst layer, and the electrode substrate and adapted to supply an oxidant; and a fuel supplier for supplying fuel to the stack.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
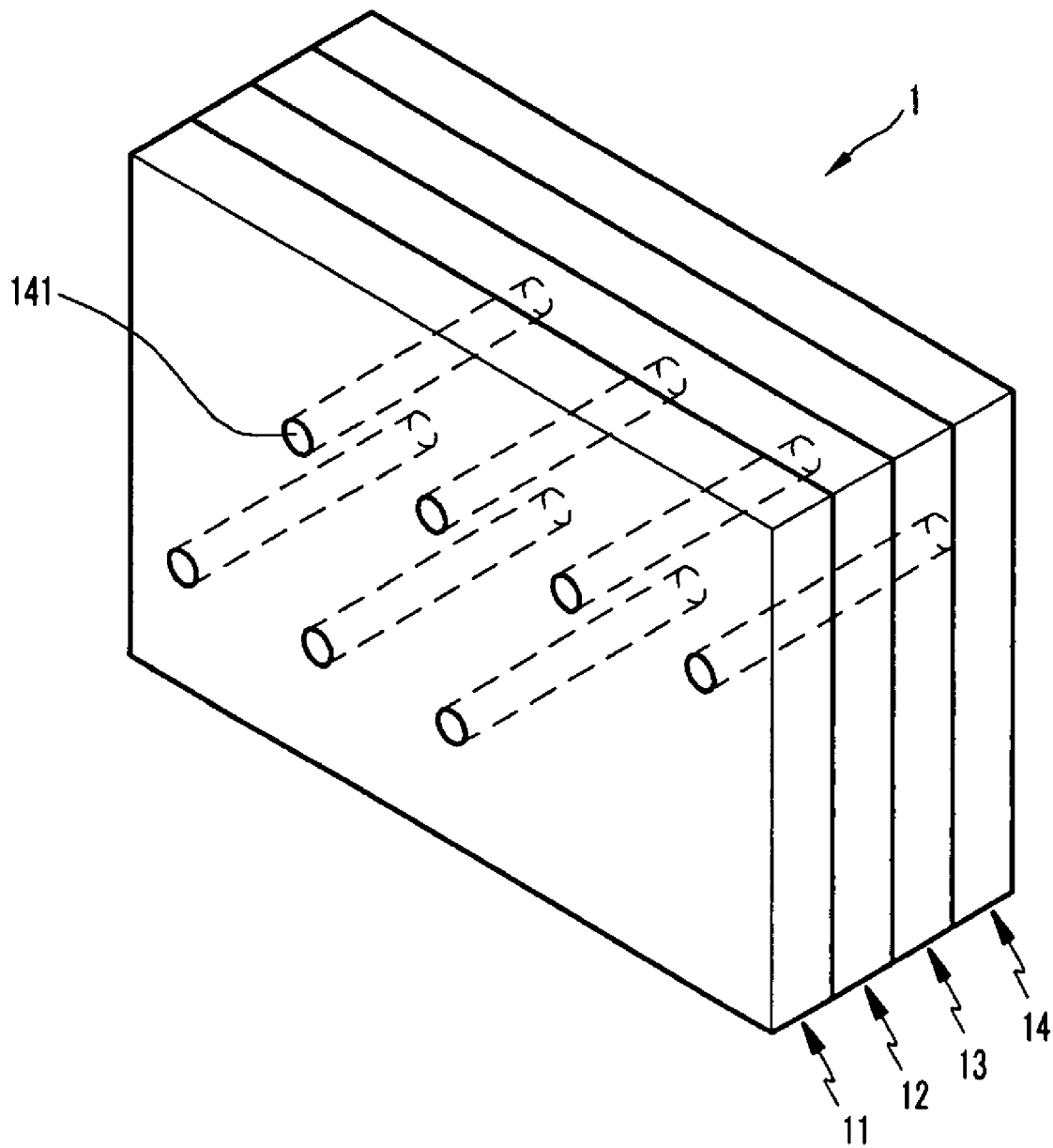
FIG. 1 is a perspective view of a membrane-electrode assembly for a mixed reactant fuel cell according to one embodiment of the present invention.

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

The present invention, in one embodiment, provides a membrane-electrode assembly for a mixed reactant fuel cell. In more detail, the present invention, in one embodiment, provides a membrane-electrode assembly for a passive-type fuel cell, or an air-breathing type fuel cell, that supplies an oxidant without using a pump. Since the passive-type fuel cell is suitable for direct oxidation using a hydrocarbon fuel, the membrane-electrode assembly in one embodiment of the present invention is for a passive-type direct oxidation mixed reactant fuel cell.

The mixed reactant fuel cell according to one embodiment of the present invention includes a catalyst selectively activating an oxidation reaction of a fuel at an anode and another catalyst selectively activating a reduction reaction of an oxidant at a cathode. Therefore, when a mixture of the fuel and the oxidant is injected into both the anode catalyst layer and the cathode catalyst layer, only an oxidation reaction of the fuel is carried out at the anode catalyst layer, and only a reduction reaction of the oxidant is carried out at the cathode catalyst layer.

The mixed reactant fuel cell in one embodiment of the present invention does not inject a mixture of the fuel and an oxidant but rather injects the fuel and an oxidant individually or separately (e.g., in a crossing direction) such that the fuel and the oxidant are mixed in a stack.

By way of example, the mixed reactant fuel cell in one embodiment of the present invention does not require separators that are needed to isolate each membrane-electrode assembly in conventional fuel cells. Further, the fuel cell according to the described embodiment does not need to take into account the cross-over of the fuel. Therefore, the mixed reactant fuel cell in one embodiment of the present invention can significantly reduce production costs for a fuel cell and also reduce the size of a fuel cell. Further, the present invention, according to one embodiment, can resolve the problem associated with supplying a reactant and air that is caused by the absence of the separators in the conventional mixed reactant fuel cell, which injects a mixture of a fuel and an oxidant, by forming an oxidant supply path.

U.S. Patent Publication No. 2003/0165727 discloses a mixed reactant fuel cell that transfers fuel and an oxidant by using a porous electrode. However, because the structure disclosed in U.S. Patent Publication No. 2003/0165727 injects the fuel and the oxidant by using a pump, the fuel cell has a large volume, and it can be difficult to use such a fuel cell in portable devices.

A membrane-electrode assembly for the mixed reactant fuel cell according to one embodiment of the present invention includes: an anode catalyst layer and a cathode catalyst layer; a polymer electrolyte membrane disposed between the anode catalyst layer and the cathode catalyst layer; an electrode substrate disposed on a surface of at least one of the anode catalyst layer or the cathode catalyst layer; and an oxidant supply path formed to penetrate the polymer electrolyte membrane, the anode catalyst layer, the cathode catalyst layer, and the electrode substrate to supply an oxidant.

Since the oxidant supply path penetrates the polymer electrolyte membrane, the anode catalyst layer, the cathode catalyst layer, and the electrode substrate, it has open ends at the outermost surfaces of the membrane-electrode assembly. An oxidant injected to the oxidant supply path is spread to the entire membrane-electrode assembly through the polymer electrolyte membrane and pores of the anode catalyst layer and the cathode catalyst layer.

The oxidant supply path is used only to supply the oxidant and does not have to be formed as a straight path. In one embodiment, the oxidant supply path is formed as a substantially straight path for ease of manufacturing. Furthermore, the orientation of the oxidant supply path is not limited specifically. In one embodiment, the oxidant supply path of a membrane-electrode assembly is formed to extend along a certain direction. As such, when more than one membrane-electrode assembly is used in the form of a stack, the respective oxidant supply paths of the membrane-electrode assemblies can be connected to each other and can therefore spread an oxidant input to an end of one oxidant supply path through the entire stack. In one embodiment, the oxidant supply paths are distributed uniformly across the membrane-electrode assembly to more uniformly (or evenly) spread the oxidant throughout the entire membrane-electrode assembly.

The oxidant supply path may be formed concurrently with a formation of the membrane-electrode assembly, or it may be formed after the membrane-electrode assemblies are stacked. In the former situation, the respective positions of the oxidant supply paths should be chosen such that the oxidant supply paths of the membrane-electrode assemblies can be connected to each other after the membrane-electrode assemblies are stacked. In one embodiment, the oxidant supply path is formed after the membrane-electrode assemblies are stacked for ease of fabrication. The oxidant supply path may be formed by punching, but the methods of forming the oxidant supply path are not limited thereto.

The area of a cross-section, which is perpendicular to the propagation direction of the oxidant supply path, may range from 1 $mm^2$ to 20 $mm^2$, and more specifically, from 2 $mm^2$ to 5 $mm^2$. When the cross-sectional area is larger than 20 $mm^2$, a ratio of an external area of the oxidant supply path to a volume occupied by the oxidant supply path in the membrane-electrode assembly may be too small such that a fuel supply efficiency is degraded. When the cross-sectional area is smaller than 1 $mm^2$, it may be difficult to supply the oxidant to the oxidant supply path.

The volume occupied by the oxidant supply path in a membrane-electrode assembly, in one embodiment, may range from 0.1% to 0.3%, and more specifically, from 0.15% to 0.2%. When the volume of the oxidant supply path in the membrane-electrode assembly exceeds 0.3% of the membrane-electrode assembly, the space occupied by the oxidant supply path may be too large such that the efficiency of the anode catalyst layer, the cathode catalyst layer, and the polymer electrolyte membrane is degraded. When the volume of the oxidant supply path is smaller than 0.1% of the membrane-electrode assembly, the oxidant may not be supplied smoothly.

In an embodiment of the present invention, the polymer electrolyte membrane, the anode catalyst layer, the cathode catalyst layer, and the electrode substrate may be porous to facilitate the transfer of the fuel and the spread of the oxidant supplied through the oxidant supply path.

The electrode substrate is formed on a side of at least one of the anode catalyst layer or the cathode catalyst layer and spreads the fuel and the oxidant into the catalyst layers. It also functions as a separator by isolating each membrane-electrode assembly when membrane-electrode assemblies are stacked. Although, in one embodiment, the electrode substrate is formed on only one side of the anode catalyst layer or the cathode catalyst layer, when the membrane-electrode assemblies are stacked, at least one electrode substrate is positioned between two of the membrane-electrode assemblies such that a short-circuit does not occur. In one embodiment, when the membrane-electrode assemblies including an electrode substrate disposed on only one side of the anode catalyst layer or the cathode catalyst layer are stacked, membrane-electrode assemblies including additional electrode substrates disposed on both the anode catalyst layer and the cathode catalyst layer are used at the outermost ends of the stack (see, for example, FIG. 2).

The electrode substrate plays a role in supporting a catalyst layer and for diffusing the fuel and the oxidant into the catalyst layers. Here, the fuel and the oxidant easily come in contact with the electrodes. In one embodiment, the electrode substrate is formed from a material such as carbon paper, carbon cloth, carbon felt, and/or a metal cloth (a porous film composed of metal fiber or a metal film disposed on a surface of a cloth composed of polymer fibers). However, the electrode substrate is not limited thereto.

At the anode catalyst layer, an oxidation reaction of the fuel occurs, and at the cathode catalyst layer, a reduction reaction of the oxidant occurs. Therefore, in one embodiment, the anode catalyst layer includes a catalyst that selectively activates the oxidation reaction of the fuel, and the cathode catalyst layer includes a catalyst that selectively activates the reduction reaction of the oxidant. By way of example, platinum-ruthenium may be used for the anode catalyst layer, and RuS, RuSe, Fe—N/C and/or Co—N/C may be used as the cathode catalyst layer. Fe—N/C (or Co—N/C) is a catalyst where the Fe or (Co) has coherence to nitrogen and is dispersed over a carbon carrier. However, the respective catalysts that can be included in the anode catalyst layer and the cathode catalyst layer are not limited to the above-mentioned materials.

The polymer electrolyte membrane, in one embodiment, plays a role of exchanging ions by transferring protons produced from an anode catalyst layer to a cathode catalyst layer, and is made of a high proton conductive polymer.

The proton conductive polymer may be a polymer resin having at its side chain a cation exchange group selected from the group consisting of a sulfonic acid group, a carboxylic acid group, a phosphoric acid group, a phosphonic acid group, and derivatives thereof.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and/or polyphenylquinoxaline-based polymers. In an exemplary embodiment, the proton conductive polymer includes at least one polymer selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and/or poly (2,5-benzimidazole). In one embodiment, the thickness of the polymer electrolyte membrane may range from 10 µm to 200 µm.

An embodiment of the present invention also provides a mixed reactant fuel cell system. The mixed reactant fuel cell system includes a stack and a fuel supplier.

The stack includes at least one membrane-electrode assembly according to an embodiment of the present invention, as described above. The membrane-electrode assembly generates electricity through the oxidation reaction of the fuel and the reduction reaction of the oxidant. High power output can be acquired when the membrane-electrode assemblies are stacked.

The fuel supplier plays a role of supplying the stack with a fuel. The fuel includes liquid or gaseous hydrogen, or a hydrocarbon-based fuel such as methanol, ethanol, propanol, and/or butanol.

In general, the oxidant includes oxygen and/or air. However, the fuel and the oxidant are not limited to the above described examples. In one embodiment, the oxidant is supplied by exposing the membrane-electrode assembly to air and letting the air in through the oxidant supply path.

The mixed reactant fuel cell system of an embodiment of the present invention can be applied to a Polymer Electrolyte Membrane Fuel Cell (PEMFC) and/or a Direct Oxidation Fuel Cell (DOFC) without limitation. In more detail, in one embodiment, the mixed reactant fuel cell system may be applied to a DOFC that uses liquid fuel, e.g., a Direct Methanol Fuel Cell (DMFC).

FIG. 1 illustrates a membrane-electrode assembly 1 in accordance with an embodiment of the present invention. The membrane-electrode assembly 1 includes a cathode catalyst layer 13, an anode catalyst layer 11, and a polymer electrolyte membrane 12 disposed between the cathode catalyst layer 13 and the anode catalyst layer 11. On one side of the cathode catalyst layer 13, an electrode substrate 14 is disposed. FIG. 1 shows the electrode substrate 14 contacting only the cathode catalyst layer 13. However, since, in one embodiment, a plurality of membrane-electrode assemblies are stacked, the electrode substrate 14 of one of the membrane-electrode assemblies contacts the anode catalyst layer 11 of another of the membrane-electrode assemblies. Accordingly, the electrode substrate 14 also plays a role of a separator. As shown in FIG. 1, an oxidant supply path 141 is formed to penetrate the polymer electrolyte membrane 12, the cathode catalyst layer 13, the anode catalyst layer 11, and the electrode substrate 14. An oxidant injected to the oxidant supply path 141 is spread through the entire membrane-electrode assembly through the polymer electrolyte membrane 12 and pores of the anode catalyst layer 11 and the cathode catalyst layer 13. In one embodiment, a plurality of oxidant supply paths 141 are distributed uniformly across the membrane-electrode assembly to more uniformly (or evenly) spread the oxidant throughout the entire membrane-electrode assembly.

Figure 2:
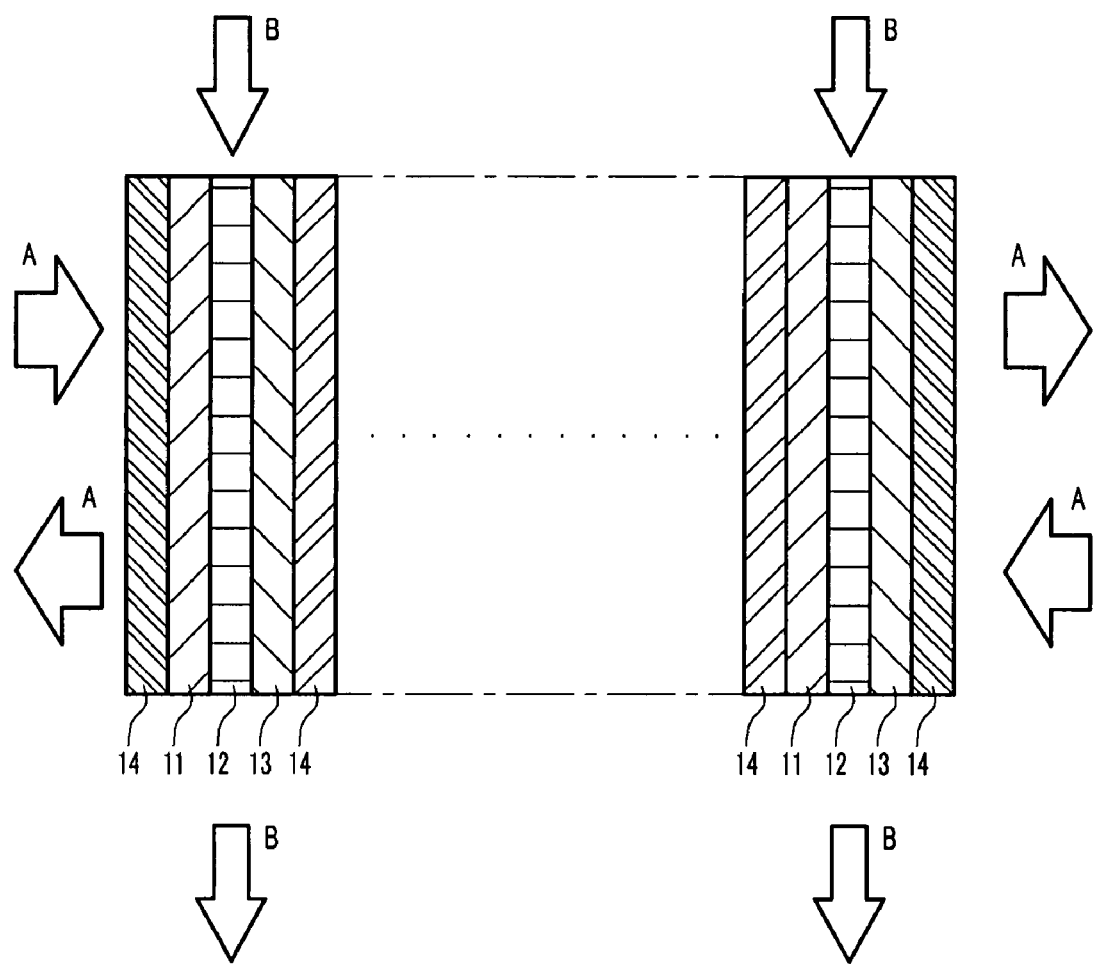
FIG. 2 schematically shows flows of a fuel and an oxidant in a stack of membrane-electrode assemblies of FIG. 1.

FIG. 2 shows respective flows of the fuel and the oxidant in one embodiment, where at least one of the membrane-electrode assemblies includes the cathode catalyst layer 13, the anode catalyst layer 11, the polymer electrolyte membrane 12 disposed between the cathode catalyst layer 13 and the anode catalyst layer 11, and the electrode substrate 14 disposed on one side of the cathode catalyst layer 13.

Also, in FIG. 2, arrows A show a direction of the flow of the oxidant. The oxidant flows in the direction of the arrows A and is spread through the entire membrane-electrode assembly through the pores of the anode catalyst layer 11 and the cathode catalyst layer 13. FIG. 2 shows the oxidant as being injected at both side ends of the membrane-electrode assembly stack. Alternatively, the oxidant may be injected at one side end of the membrane-electrode assembly stack according to the structure of the membrane-electrode assembly stack or the fuel cell system.

In FIG. 2, arrows B show a direction of the flow of the fuel. The fuel flows in the direction of the arrows B to be spread through the entire membrane-electrode assembly through the pores of the anode catalyst layer 11 and the cathode catalyst layer 13.

Figure 3:
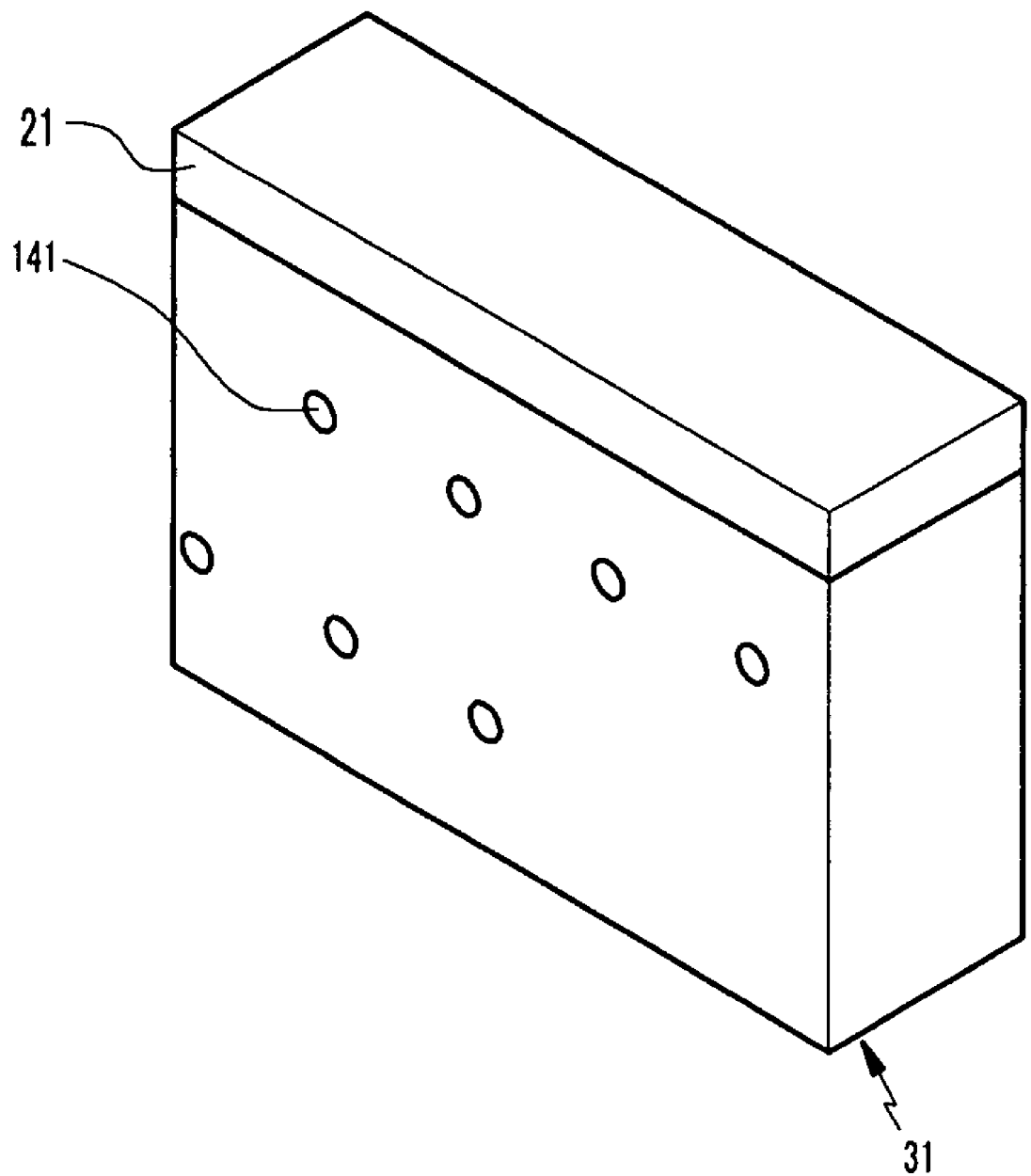
FIG. 3 is a perspective view showing a mixed reactant fuel cell system according to an embodiment of the present invention.

FIG. 3 shows a perspective view of the fuel cell system of an embodiment of the present invention. As illustrated in FIG. 3, the fuel cell system includes a stack 31 including one or more membrane-electrode assemblies according to a described embodiment of the present invention, and a fuel supplier 21 for supplying fuel to the stack 31. The fuel cell system also includes oxidant supply paths 141 penetrating the stack 31 and for supplying the oxidant. When the fuel is supplied to the stack 31, the fuel is injected through the porous electrode substrates and spread into the catalyst layers. Here, although the polymer electrolyte membranes are porous, the direction in which the pores of the polymer electrolyte membranes are formed is not substantially the same as a direction in which the fuel is supplied. Therefore, the fuel does not substantially permeate the polymer electrolyte membranes along a direction (e.g., from an anode to a cathode).

The following example illustrates the present invention in more detail. However, it is understood that the present invention is not limited by this example.

EXAMPLE 1

A cathode catalyst slurry was prepared by mixing RuSe/C 13.9 g, polyperfluorosulfonate binder 4.2 g, and 7.1 ml of a solvent mixture of isopropyl alcohol and water (which was prepared at a volume ratio of 9:1), and a carbon paper electrode substrate was prepared (or provided). A cathode for a fuel cell was prepared by coating the carbon paper electrode substrate with the cathode catalyst slurry.

An anode catalyst slurry was prepared by mixing platinum-ruthenium black 3.0 g, polyperfluorosulfonate binder 1.44 g, and 18 ml of a solvent mixture of isopropyl alcohol and water (prepared at a volume ratio of 9:1), and an anode for the fuel cell was prepared by coating a carbon paper electrode substrate with the anode catalyst slurry.

A membrane-electrode assembly was prepared by disposing a Nafion® (perfluorosulfonic acid) polymer electrolyte membrane between the anode and the cathode and hot-pressing them together at 150° C. at a pressure of 200 kgf/cm$^2$ for three minutes to fix the anode and the cathode on the polymer electrolyte membrane.

An oxidant supply path having a cross-sectional area of 2 mm$^2$ was formed to occupy 0.2% of the membrane-electrode assembly by punching the above-prepared membrane-electrode assembly.

A stack of membrane-electrode assemblies prepared as described above was formed by interposing carbon cloth between the membrane-electrode assemblies and stacking the membrane-electrode assemblies such that the oxidant supply paths could be connected.

The fuel cell system using the membrane-electrode assembly stack has a feature in that it has a significantly reduced volume compared to a conventional fuel cell system of substantially the same power output.

The membrane-electrode assembly for a mixed reactant fuel cell, in one embodiment of the present invention, can provide fuel and the oxidant to catalyst layers smoothly and evenly, and thereby improve fuel cell performance.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A membrane-electrode assembly in a mixed reactant fuel cell, the membrane-electrode assembly comprising:
   an anode catalyst layer;
   a cathode catalyst layer;
   a polymer electrolyte membrane disposed between the anode catalyst layer and the cathode catalyst layer;
   an electrode substrate disposed on at least one of the anode catalyst layer or the cathode catalyst layer and configured to isolate the membrane-electrode assembly from an other membrane-electrode assembly; and
   an oxidant supply path penetrating the polymer electrolyte membrane, the anode catalyst layer, the cathode catalyst layer, and the electrode substrate and configured to supply an oxidant to mix with a fuel in each of the anode catalyst layer and the cathode catalyst layer.

2. The membrane-electrode assembly of claim 1, wherein the polymer electrolyte membrane, the anode catalyst layer, and the cathode catalyst layer are porous.

3. The membrane-electrode assembly of claim 1, wherein a cross-section of the oxidant supply path perpendicular to a propagation direction of the oxidant supply path has an area ranging from about 1 mm$^2$ to about 20 mm$^2$.

4. The membrane-electrode assembly of claim 1, wherein a cross-section of the oxidant supply path perpendicular to a propagation direction of the oxidant supply path has an area ranging from about 2 mm$^2$ to about 5 mm$^2$.

5. The membrane-electrode assembly of claim 1, wherein the oxidant supply path occupies a volume of the membrane-electrode assembly ranging from about 0.1% to about 0.3%.

6. The membrane-electrode assembly of claim 1, wherein the oxidant supply path occupies a volume of the membrane-electrode assembly ranging from about 0.15% to about 0.2%.

7. The membrane-electrode assembly of claim 1, wherein the electrode substrate comprises a material selected from the group consisting of carbon paper, carbon cloth, carbon felt, metal cloth, and combinations thereof.

8. The membrane-electrode assembly of claim 1, wherein the fuel is supplied to the membrane-electrode assembly in a direction substantially perpendicular to a propagation direction of the oxidant supply path.

9. The membrane-electrode assembly of claim 1, wherein the polymer electrolyte membrane comprises a polymer resin having at its side chain a cation exchange group selected from the group consisting of a sulfonic acid group, a carboxylic acid group, a phosphoric acid group, a phosphonic acid group, and derivatives thereof.

10. The membrane-electrode assembly of claim 9, wherein the polymer resin comprises at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, polyphenylquinoxaline-based polymers, and combinations thereof.

11. A mixed reactant fuel cell system, comprising:
    a stack comprising at least one membrane-electrode assembly comprising:
       an anode catalyst layer;
       a cathode catalyst layer;
       a polymer electrolyte membrane disposed between the anode catalyst layer and the cathode catalyst layer;
       an electrode substrate disposed on at least one of the anode catalyst layer or the cathode catalyst layer and configured to isolate the membrane-electrode assembly from an other membrane-electrode assembly; and
       an oxidant supply path penetrating the polymer electrolyte membrane, the anode catalyst layer, the cathode catalyst layer, and the electrode substrate and configured to supply an oxidant to mix with a fuel in each of the anode catalyst layer and the cathode catalyst layer; and
    a fuel supplier for supplying the fuel to the stack.

12. The mixed reactant fuel cell system of claim 11, wherein the polymer electrolyte membrane, the anode catalyst layer, and the cathode catalyst layer are porous.

13. The mixed reactant fuel cell system of claim 11, wherein a cross-section of the oxidant supply path perpendicular to a propagation direction of the oxidant supply path has an area ranging from about 1 mm$^2$ to about 20 mm$^2$.

14. The mixed reactant fuel cell system of claim 11, wherein a cross-section of the oxidant supply path perpendicular to a propagation direction of the oxidant supply path has an area ranging from about 2 mm$^2$ to about 5 mm$^2$.

15. The mixed reactant fuel cell system of claim 11, wherein the oxidant supply path occupies a volume of the at least one membrane-electrode assembly ranging from about 0.1% to about 0.3%.

16. The mixed reactant fuel cell system of claim 11, wherein the oxidant supply path occupies a volume of the at least one membrane-electrode assembly ranging from about 0.15% to about 0.2%.

17. The mixed reactant fuel cell system of claim 11, wherein the electrode substrate comprises a material selected from the group consisting of carbon paper, carbon cloth, carbon felt, metal cloth, and combinations thereof.

18. The mixed reactant fuel cell system of claim 11, wherein the mixed reactant fuel cell system is a passive-type fuel cell system.

19. The mixed reactant fuel cell system of claim 11, wherein the polymer electrolyte membrane has pores formed in a direction substantially different from a direction in which the fuel supplier supplies the fuel to the stack.

20. The mixed reactant fuel cell system of claim 11, wherein the at least one membrane-electrode assembly further comprises at least one other oxidant supply path penetrating the polymer electrolyte membrane, the anode catalyst layer, the cathode catalyst layer, and the electrode substrate and adapted to supply an oxidant, the oxidant supply path and the at least one other oxidant supply path being positioned substantially uniformly across the at least one membrane-electrode assembly.

21. The mixed reactant fuel cell system of claim 11, wherein the fuel supplier supplies the fuel to the stack in a direction substantially perpendicular to a propagation direction of the oxidant supply path.

* * * * *